United States Patent
Chen

(10) Patent No.: US 8,213,906 B2
(45) Date of Patent: Jul. 3, 2012

(54) COMMUNICATION SERVER AND METHOD FOR GENERATING A ONE-TIME PASSWORD USING A MOBILE PHONE

(75) Inventor: Cho-Jan Chen, Tu-Cheng (TW)

(73) Assignee: Chi Mei Communications Systems, Inc., Tu-Cheng, New Taipei (TW)

( * ) Notice: Subject to any disclaimer, the term of this patent is extended or adjusted under 35 U.S.C. 154(b) by 381 days.

(21) Appl. No.: 12/510,441

(22) Filed: Jul. 28, 2009

(65) Prior Publication Data

US 2010/0099380 A1  Apr. 22, 2010

(30) Foreign Application Priority Data

Oct. 20, 2008  (CN) .......................... 2008 1 0305010

(51) Int. Cl.
*H04M 1/66* (2006.01)

(52) U.S. Cl. ........ 455/411; 455/410; 455/418; 380/247; 726/26

(58) Field of Classification Search .................. 455/411, 455/410, 418; 380/247; 726/26
See application file for complete search history.

(56) References Cited

U.S. PATENT DOCUMENTS

| | | | |
|---|---|---|---|
| 6,928,558 B1* | 8/2005 | Allahwerdi et al. | 726/9 |
| 2006/0094403 A1* | 5/2006 | Norefors et al. | 455/411 |
| 2007/0189532 A1* | 8/2007 | Onozu et al. | 380/247 |
| 2007/0256118 A1* | 11/2007 | Nomura et al. | 726/3 |
| 2008/0295159 A1* | 11/2008 | Sentinelli | 726/6 |
| 2009/0241175 A1* | 9/2009 | Trandal et al. | 726/7 |
| 2009/0271868 A1* | 10/2009 | Ogawa | 726/26 |

* cited by examiner

*Primary Examiner* — Danh Le

(74) *Attorney, Agent, or Firm* — Altis Law Group, Inc.

(57) ABSTRACT

A method for generating one-time password (OTP) using a mobile phone registers a telephone number of the mobile phone on a website at first. A communication server generates a first random number and a second random number. Furthermore, the communication server generates a first OTP according to the first random number, and a subscriber identity module (SIM) card of the mobile phone generates a second OTP according to the second random number. The communication server checks if the second OTP is the same as the first OTP. If the second OTP is the same as the first OTP, the mobile phone has successfully logged onto the website.

13 Claims, 3 Drawing Sheets

COMMUNICATION SERVER AND METHOD FOR GENERATING A ONE-TIME PASSWORD USING A MOBILE PHONE

BACKGROUND

1. Technical Field

Embodiments of the present disclosure relate to password generating methods, and more particularly to a communication server and a method for generating a one-time password (OTP) using a mobile phone.

2. Description of Related Art

If a user wants to log onto a website, the user has to be authenticated. Many websites use one-time passwords (OTPs) to authenticate users. In such a case, the user has to get an OTP token from a website in order to log onto the website. It is safe but not convenient.

Therefore, an effective method is needed for overcoming the above-described shortcomings.

DETAILED DESCRIPTION

All of the processes described below may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
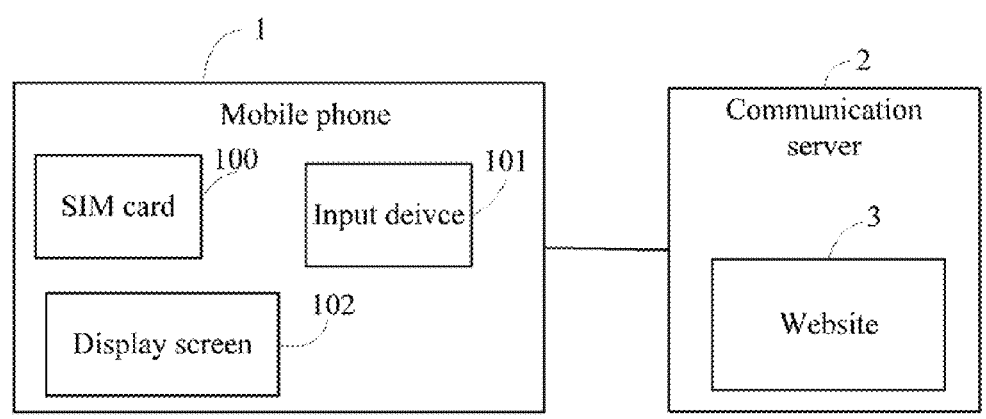
FIG. 1 is a block diagram of one embodiment of a communication server for generating an OTP using a mobile phone.

FIG. 1 is a block diagram of one embodiment of a communication server 2 for generating a one-time password (OTP) using a mobile phone 1. In one embodiment, the mobile phone 1 communicates with other communication devices, such as computers or other mobile phones, via a global system for mobile communications (GSM) network. The mobile phone 1 includes a subscriber identity module (SIM) card 100 comprising SIM tool kit (STK) instructions. The communication server 2 may be a server of a telecom operator, such as China Mobile. The communication sever 2 hosts a website 3 which receives and stores user identifiers (IDs) and passwords of the user IDs set by users. A user may use the mobile phone 1 to log onto the website 3 by inputting a corresponding user ID and one or more passwords via an input device 101 of the mobile phone 1. The mobile phone 1 displays information of the website 3 to the user via a display screen 102 of the mobile phone 1. In one embodiment, the input device 101 may be a touch panel.

In one embodiment, in order to access the website 3, the user first inputs a user identifier (ID) and a first password using the input device 101 of the mobile phone 1. In one embodiment, the website 3 may be a bank website. The user ID may be an account number of an automatic teller machine (ATM) card, and the first password may be a personal identification number (PIN) of the ATM card.

The communication server 2 receives the user ID and the first password input by the user, and checks if the user ID corresponds to the first password. If the user ID corresponds to the first password, the website 3 prompts the user to input a second password and register the telephone number of the mobile phone 1. The website 3 receives the second password and the telephone number of the mobile phone 1 inputted by the user, then sends a request to validate the telephone number to the communication server 2. If the communication server 2 determines the telephone number of the mobile phone 1 is valid, the website 3 displays that the telephone number of the mobile phone 1 has been registered successfully. The website 3 connects the user ID, the second password, and the telephone number. If the communication server 2 determines the telephone number of the mobile phone is invalid, the website 3 displays that the telephone number of the mobile phone 1 has not been registered successfully.

Furthermore, the communication server 2 generates a first random number and a second random number, and calculates a first OTP of the user ID according to the first random number and the second password.

Moreover, the SIM card 100 calculates a second OTP of the user ID according to the second random number and the second password. The second OTP is displayed on the display screen 102 for the user to input. The website 3 receives the second OTP inputted by the user.

The communication server 2 checks if the second OTP is the same as the first OTP. If the second OTP is the same as the first OTP, the website 3 displays that the user has logged onto the website 3 successfully. If the second OTP is not the same as the first OTP, the website 3 displays that the user has failed to log onto the website 3. After logging onto the website 3, the user can do online transactions, such as transferring funds via the bank website using the mobile phone 1.

Figure 2:
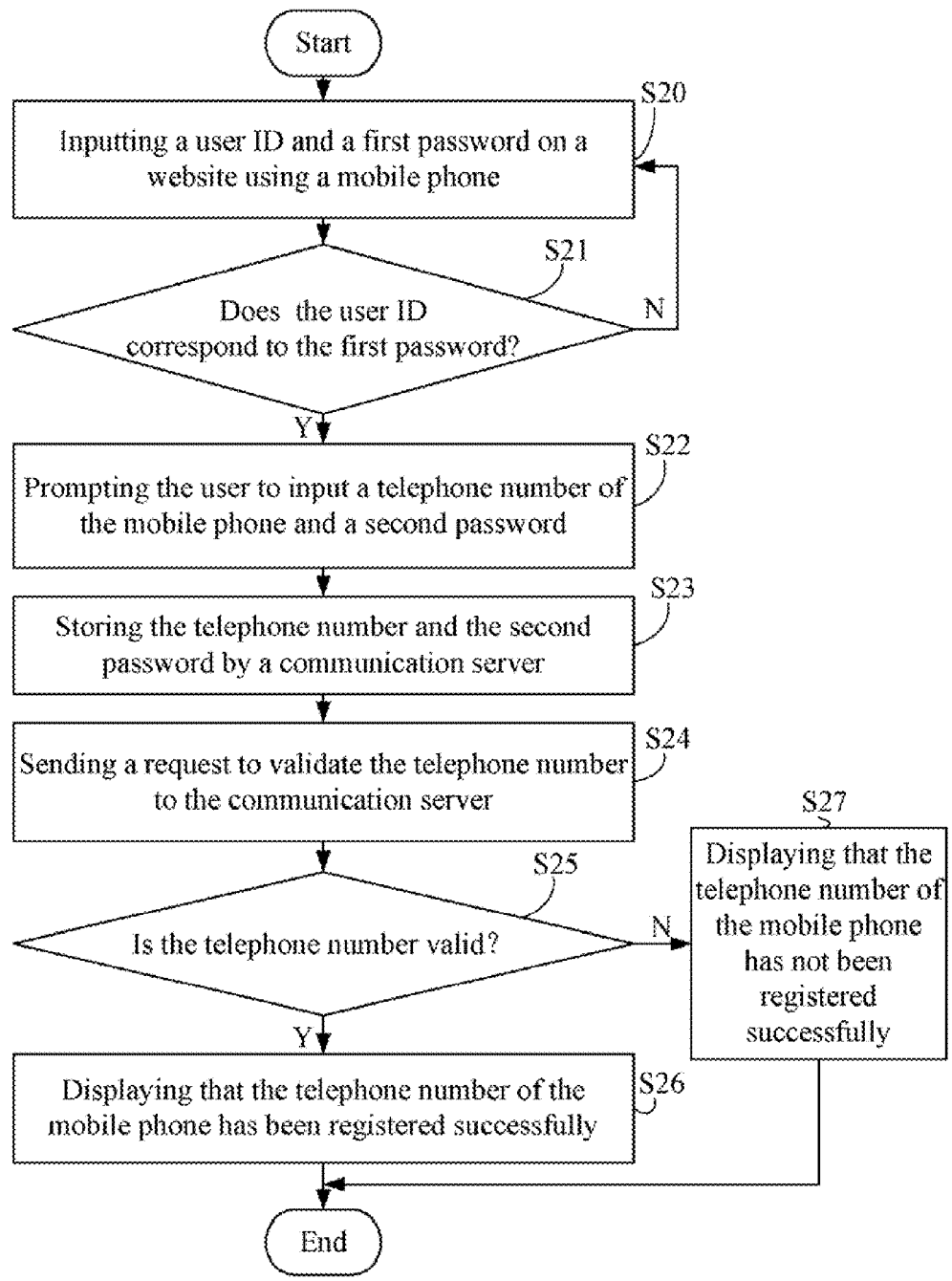
FIG. 2 is a flowchart of one embodiment of a method for registering a telephone number of the mobile phone on a website.

FIG. 2 is a flowchart of one embodiment of a method for registering a telephone number of the mobile phone 1 on the website 3. In block S20, a user inputs a user ID and a first password on the website 3 using the mobile phone 1.

In block S21, the communication server 2 checks if the user ID corresponds to the first password. If the user ID corresponds to the first password, the procedure goes to block S22. If the user ID does not correspond to the first password, the procedure returns to block S20.

In block S22, the website 3 prompts the user to input the telephone number of the mobile phone 1 and a second password of the user ID set by the user.

In block S23, the communication server 2 stores the telephone number of the mobile phone 1 and the second password.

In block S24, the website 3 sends a request to validate the telephone number to the communication server 2.

In block S25, the communication server 2 checks if the telephone number of the mobile phone 1 is valid. If the telephone number of the mobile phone 1 is valid, in block S26, the website 3 displays that the telephone number of the mobile phone 1 has been registered successfully. If the telephone number of the mobile phone 1 is invalid, in block S27, the website 3 displays that the telephone number of the mobile phone 1 has not been registered successfully.

Figure 3:
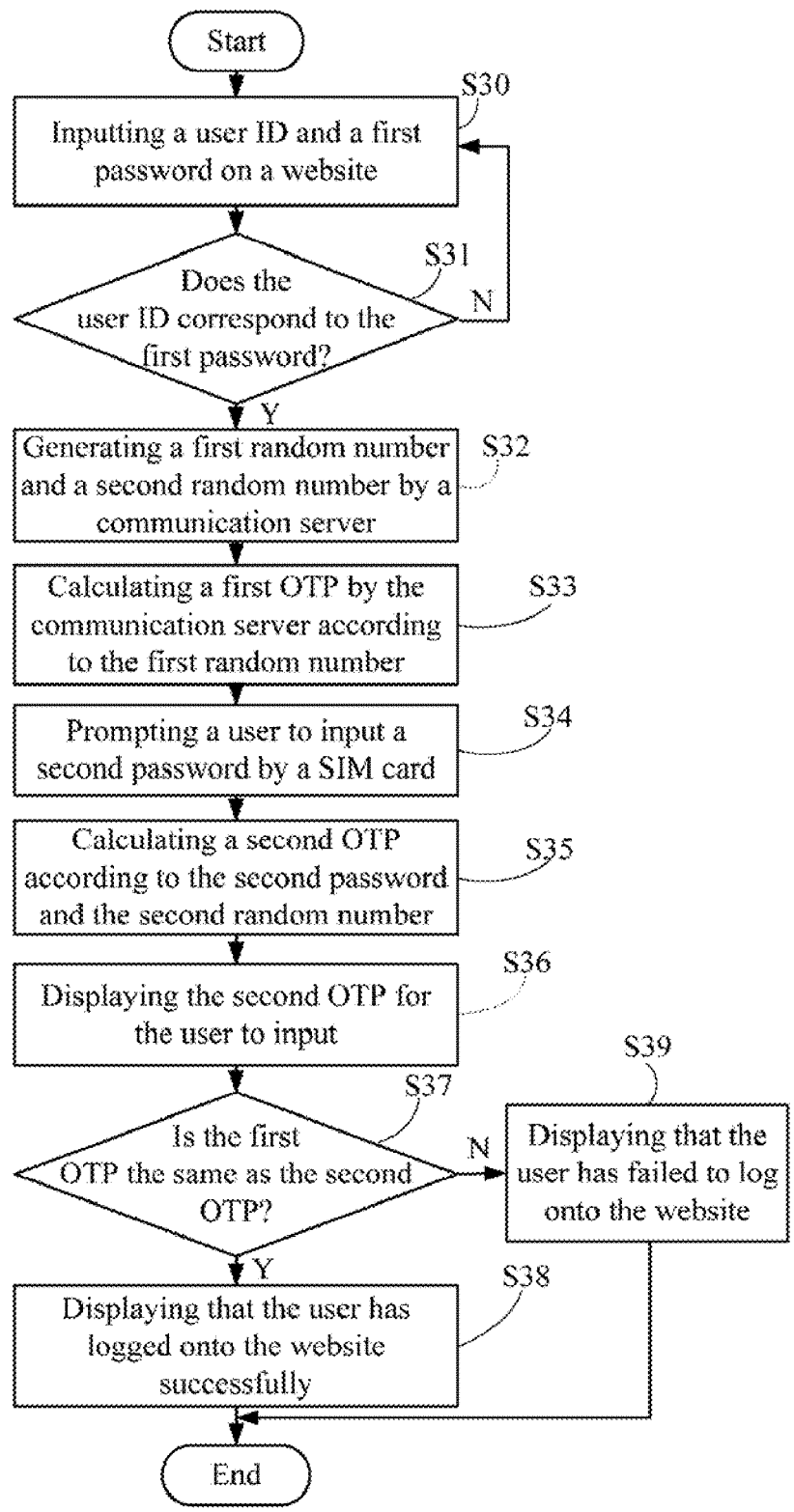
FIG. 3 is a flowchart of one embodiment of a method for generating an OTP using a mobile phone.

FIG. 3 is a flowchart of one embodiment of a method for generating an OTP using the mobile phone 1. In block S30, a user inputs a user ID and a first password on the website 3 when the user wants to log onto the website 3.

In block S31, the communication server 2 checks if the user ID corresponds to the first password. If the user ID corresponds to the first password, the procedure goes to block S32. If the user ID does not correspond to the first password, the procedure returns to block S30.

In block S32, the communication server 2 generates a first random number and a second random number. In one embodiment, the communication server 2 generates a random number every one minute. In one embodiment, if the time interval between the generation of the first random number and the generation of the second random number is less than one minute, the second random number is the same as the first random number.

In block S33, The communication server 2 calculates a first OTP of the user ID according to the second password stored in the website 3 and the first random number.

In block S34, the STK instructions are executed, then the SIM card 100 prompts the user to input the second password.

In block S35, the SIM card 100 calculates a second OTP according to the second password input by the user and the second random number.

In block S36, the SIM card 100 displays the second OTP on the display screen 102. The user inputs the second OTP using the input device 101.

In block S37, the communication server 2 checks if the second OTP is the same as the first OTP. If the second OTP is the same as the first OTP, in block S38, the website 3 displays that user has logged onto the website 3 successfully. If the second OTP is not the same as the first OTP, in block S39, the website 3 displays that the user has failed to log onto the website 3.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A communication server for generating a one-time password (OTP) using a mobile phone, the communication server executing a method comprising:
   displaying a website operable to receive a user identifier (ID) and a first password input by a user of the mobile phone, to check if the user ID corresponds to the first password, wherein the website requests the communication server to validate a telephone number of the mobile phone, displays that the mobile phone has been registered successfully if the telephone number of the mobile phone is valid, and displays that the mobile phone has not been registered successfully if the telephone number is invalid;
   calculating a first OTP according to a second password of the user ID stored in the communication server and a first random number, in response that the user ID corresponds to the first password;
   checking if a second OTP is the same as the first OTP, and displaying that the user has logged onto the website successfully if the second OTP is the same as the first OTP, or displaying that the user has failed to log onto the website if the second OTP is not the same as the first OTP, wherein the second OTP is generated according to a second password inputted by the user and a second random number by a subscriber identity module (SIM) card of the mobile phone.

2. The communication server of claim 1, wherein the second OTP is displayed on a display screen of the mobile phone for the user to input.

3. The communication server of claim 1, wherein the first random number and the second random number are generated by the communication server.

4. The communication server of claim 1, wherein the second random number is the same as the first random number.

5. A method for generating a one-time password using a mobile phone, the method comprising:

(a) using a website hosted by a communication server to input a user identifier (ID) and a first password by a user using the mobile phone, the communication server in communication with the mobile phone, wherein the website requests the communication server to validate a telephone number of the mobile phone, displays that the mobile phone has been registered successfully if the telephone number of the mobile phone is valid, and displays that the mobile phone has not been registered successfully if the telephone number is invalid;
   (b) checking if the user ID corresponds to the first password by the website;
   (c) calculating a first one-time password (OTP) according to a second password stored in the communication server if the user ID corresponds to the first password;
   (d) calculating a second OTP by a subscriber identity module (SIM) card of the mobile phone according to a second password inputted by the user and a second random number; and
   (e) checking if the first OTP is the same as the second OTP by the communication server, and displaying that the user has logged onto the website successfully if the first OTP is the same as the second OTP, or displaying that the user has failed to log onto the website if the first OTP is not the same as the second OTP.

6. The method of claim 5, before step (e), further comprising:
   displaying the second OTP on a screen of the mobile phone for the user to input; and
   receiving the second OTP by the communication server.

7. The method of claim 5, before (c) further comprising:
   generating the first random number and the second random number by the communication server.

8. The method of claim 5, wherein the second random number is the same as the first random number.

9. A computer-readable medium having stored therein instructions that, when executed by a mobile phone, cause the mobile phone to perform a method for generating a one-time password, the method comprising:

(a) using a website hosted by a communication server to input a user identifier (ID) and a first password by a user using the mobile phone, the communication server in communication with the mobile phone, wherein the website requests the communication server to validate a telephone number of the mobile phone, displays that the mobile phone has been registered successfully if the telephone number of the mobile phone is valid, and displays that the mobile phone has not been registered successfully if the telephone number is invalid;
   (b) checking if the user ID corresponds to the first password by the website;
   (c) calculating a first one-time password (OTP) according to a second password stored in the communication server if the user ID corresponds to the first password;
   (d) calculating a second OTP by a subscriber identity module (SIM) card of the mobile phone according to a second password inputted by the user and a second random number; and
   (e) checking if the first OTP is the same as the second OTP by the communication server, and displaying that the user has logged onto the website successfully if the first OTP is the same as the second OTP, or displaying that the user has failed to log onto the website if the first OTP is not the same as the second OTP.

10. The medium of claim 9, before step D, wherein the method further comprises:

displaying the second OTP on a screen of the mobile phone for the user to input; and receiving the second OTP by the communication server.

11. The medium of claim 9, before (f) further comprising: generating a first random number by the mobile phone, and calculating the first OTP according to the second password and the first random number.

12. The medium of claim 9, before (c) wherein the method further comprises:
generating the first random number and the second random number by the communication server.

13. The medium of claim 9, wherein the second random number is the same as the first random number.

* * * * *

UNITED STATES PATENT AND TRADEMARK OFFICE
CERTIFICATE OF CORRECTION

PATENT NO. : 8,213,906 B2  
APPLICATION NO. : 12/510441  
DATED : July 3, 2012  
INVENTOR(S) : Chen Page 1 of 1

It is certified that error appears in the above-identified patent and that said Letters Patent is hereby corrected as shown below:

On the title page item [73] should read:

[73] Assignee: Chi Mei Communication Systems, Inc., Tu-Cheng, New Taipei (TW)

Signed and Sealed this  
Twenty-ninth Day of October, 2013

Teresa Stanek Rea  
*Deputy Director of the United States Patent and Trademark Office*